(12) United States Patent
Levin et al.

(10) Patent No.: US 8,418,681 B2
(45) Date of Patent: Apr. 16, 2013

(54) BALL THROWER

(75) Inventors: Mark Levin, Papillion, NE (US); Gwendolyn Newsome, Omaha, NE (US); Ryan P. Davidson, Evansville, IN (US)

(73) Assignee: Sergeant's Pet Care Products, Inc., Omaha, NE (US)

( * ) Notice: Subject to any disclaimer, the term of this patent is extended or adjusted under 35 U.S.C. 154(b) by 301 days.

(21) Appl. No.: 12/833,574

(22) Filed: Jul. 9, 2010
(Under 37 CFR 1.47)

(65) Prior Publication Data

US 2012/0006309 A1    Jan. 12, 2012

(51) Int. Cl.
*F41B 3/00* (2006.01)

(52) U.S. Cl.
USPC ............................................................ 124/5

(58) Field of Classification Search .................. 124/5
See application file for complete search history.

(56) References Cited

U.S. PATENT DOCUMENTS

| 491,558 | A | * | 2/1893 | Hill ................................. 124/5 |
| 3,115,342 | A | * | 12/1963 | Webster ........................ 473/457 |
| 3,841,292 | A | | 10/1974 | Hoffman |
| 4,974,574 | A | | 12/1990 | Cutlip |
| D424,640 | S | | 5/2000 | Oblack |
| 6,076,829 | A | | 6/2000 | Oblack |
| 6,477,745 | B2 | | 11/2002 | Strebl |
| D484,938 | S | | 1/2004 | Tu |
| D554,717 | S | | 11/2007 | McKinnell |
| 7,686,001 | B2 | | 3/2010 | Fitt |
| 2005/0263962 | A1 | | 12/2005 | Roh et al. |

OTHER PUBLICATIONS

Ballistic Dog Ball Blaster, Litterboy.com, dated Dec. 28, 2009 (1 page).

* cited by examiner

*Primary Examiner* — John Ricci
(74) *Attorney, Agent, or Firm* — Polsinelli Shughart PC

(57) ABSTRACT

A ball thrower is described. The ball thrower includes a throwing end and a reserve end. The throwing end provides for a ball to be held and released from the ball thrower during a throwing motion. The reserve end provides a place or a compartment to hold the ball securely when the ball thrower is not in use. Further, a first and a second ball may be maintained at the throwing end and at the reserve end, respectively.

21 Claims, 6 Drawing Sheets

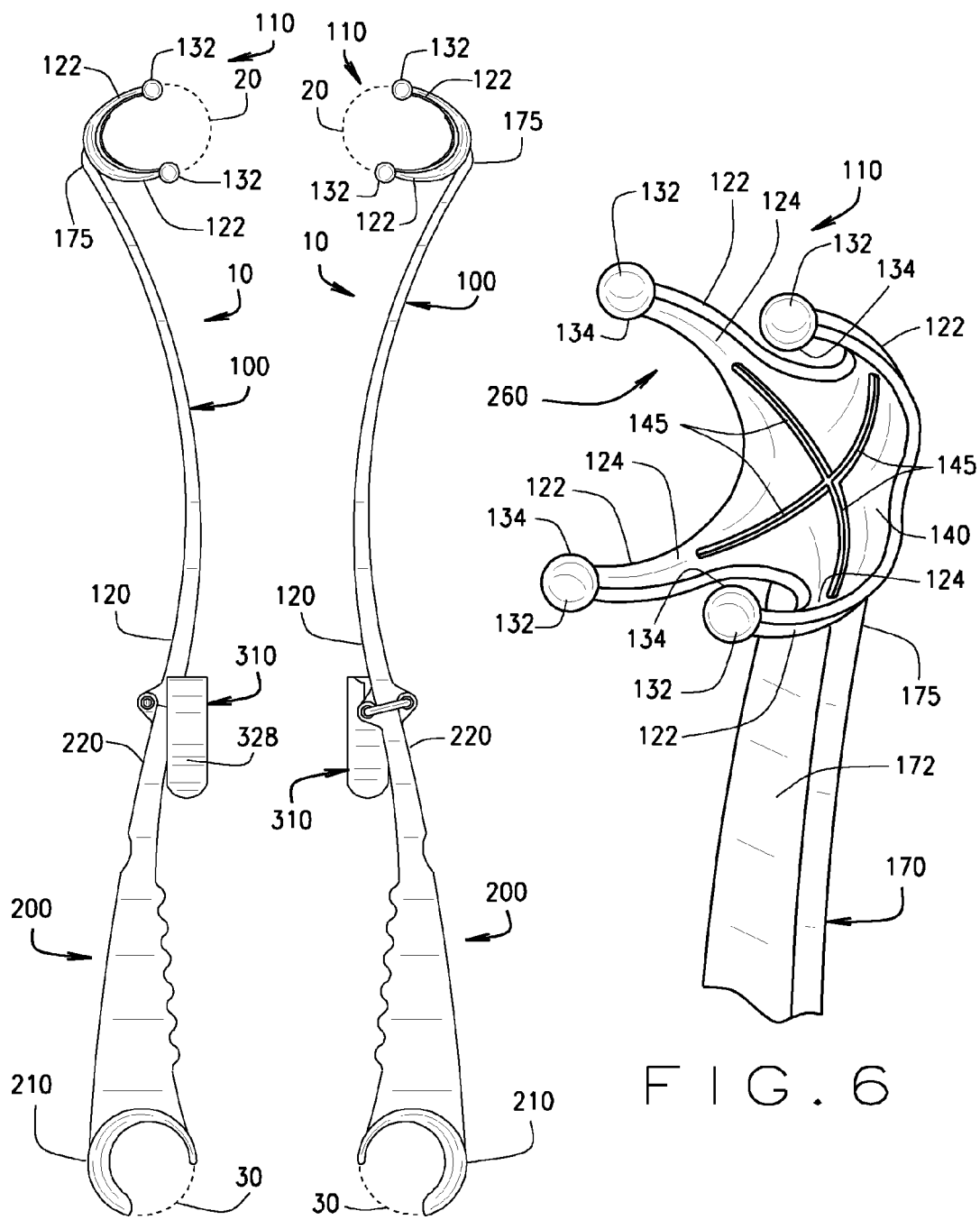

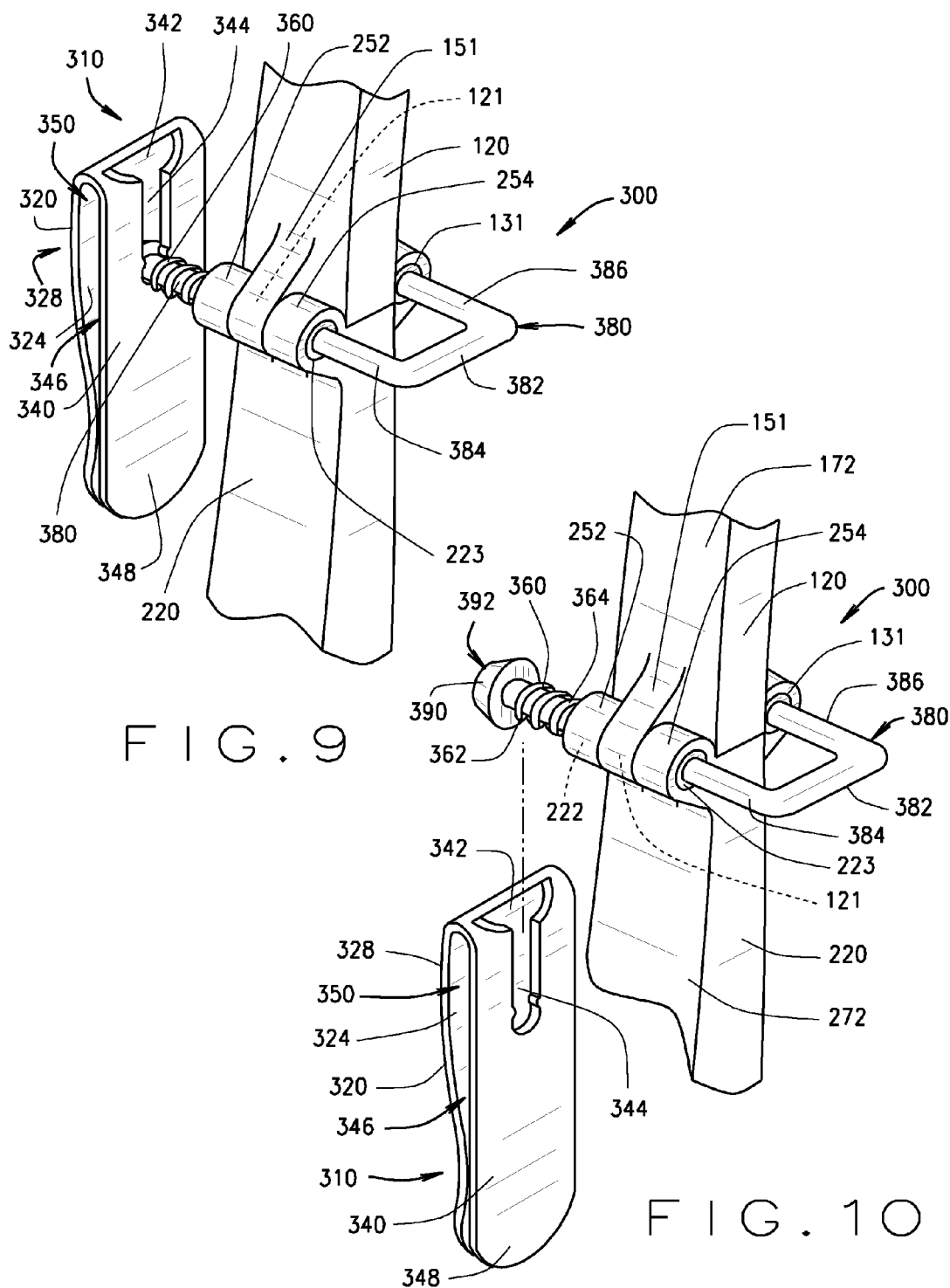

BALL THROWER

FIELD OF INVENTION

The present invention relates to a ball thrower for throwing a ball.

BACKGROUND OF INVENTION

Ball throwers are commonly used to throw balls. The ball throwers may be used with pets, especially dogs, during play activities. For example, the ball throwers may be used during a game of fetch or with other throw and retrieve games. Typically, the ball throwers include a throwing end attached to an extended arm that allows the operator to grip the arm and throw the ball with a throwing motion. Such ball throwers may be several feet long, and are therefore awkward and difficult to store and carry when not in use. Further, typical ball throwers include only a single throwing end. As such, the ball thrower may only maintain a single ball in the ball thrower.

SUMMARY OF INVENTION

A ball thrower is described herein that includes a throwing end and a reserve end. The throwing end provides for a ball to be held and released from the ball thrower during a throwing motion. The reserve end provides a place or a compartment to hold the ball securely when the ball thrower is not in use. Further, a first and a second ball may be maintained at the throwing end and at the reserve end, respectively.

The ball thrower is hingedly collapsible. As such, the ball thrower may be collapsed to provide a reduced size for storage.

Further, the ball thrower includes the reserve end and the throwing end to accommodate the first and the second ball. A pet owner, playing with multiple pets, may use the ball thrower to repetitively throw several balls.

The reserve end maintains the ball in a secure engagement for storage. Normal walking, storage activities, or travel movements will not cause the ball to release from the reserve end. For example, the ball thrower may be maintained in a car trunk or the like in a collapsed configuration with the ball in the reserve end. Due to the secure engagement provided by the reserve end to the ball, the ball is unlikely to release or separate from the reserve end until the ball is manually pulled from the reserve end.

The ball thrower further includes a throwing arm and a reserve arm that are hingedly connectable. When the operator desires to use the ball thrower, the ball thrower may be opened and securely locked into an open configuration with the ball thrower fully extended. During storage, the throwing arm may be hingedly collapsed on the reserve arm to provide for the reduced storage space.

In one aspect, a ball thrower is provided. The ball thrower includes a throwing arm. The throwing arm includes a throwing end and a first joint end. The throwing end and the first joint end are oppositely disposed on the throwing arm. The throwing end holds and releases a ball. The ball thrower includes a reserve arm, which includes a reserve end and a second joint end. The reserve end and the second joint end are oppositely disposed on the reserve arm. The first joint end is in a hinging engagement with the second joint end. The reserve end holds the ball.

In another aspect, a ball thrower includes a throwing arm, which includes a throwing end. The throwing end releases a ball during a throwing motion. The ball thrower includes a reserve arm. The reserve arm includes a reserve end, which holds the ball in a secure engagement.

In another aspect, a ball thrower includes a first arm, which includes a throwing end and a first joint end. The throwing end and the first joint end are oppositely disposed on the first arm. The throwing end releases a ball. The ball thrower includes a second arm, which includes a second joint end. The first joint end is in a hinging engagement with the second joint end. The hinging engagement includes a locking member that locks the throwing arm and the reserve arm in an open position.

In another aspect, a method of using a ball thrower is provided. The method includes providing a ball thrower, which includes a throwing end and a reserve end. The throwing end and the reserve end are oppositely disposed on the ball thrower. The throwing end releases a ball. The reserve end holds the ball. The method further includes removing the ball from the reserve end and placing the ball in the throwing end. The method further includes throwing the ball from the throwing end of the ball thrower.

In another aspect, a method of using a ball thrower is provided. The method includes providing a ball thrower, which includes a throwing end and a reserve end. The throwing end and the reserve end are oppositely disposed on the ball thrower. The throwing end releases a ball, and the reserve end holds the ball. The method further includes removing the ball from the reserve end and placing the ball in the throwing end. The method further includes throwing the ball from the throwing end of the ball thrower.

In another aspect, a method of manufacturing a ball thrower is provided. The method includes providing a first arm and a second arm. The first arm includes a throwing end to release a ball when a throwing motion is applied to the ball thrower. The method further includes engaging the first arm to the second arm in a hinging engagement via a hinging member. The second arm hinges relative to the first arm. The hinging member locks and unlocks the second arm relative to the first arm.

DESCRIPTION OF FIGURES

FIG. 4 is a first side view of the ball thrower.
FIG. 5 is a second side view of the ball thrower.
FIG. 6 is a view of the throwing end.
FIG. 9 is a view of the clip of the ball thrower.
FIG. 10 is a view showing the clip separated from the joint of the ball thrower.

DETAILED DESCRIPTION OF INVENTION

A ball thrower is described herein. The ball thrower may be used to throw balls when playing with pets. The ball thrower includes multiple ends to hold and release balls. The ball thrower includes a throwing end to release the ball during a throwing motion. The ball thrower includes a reserve end to store the ball or an extra ball. The ball thrower also collapses to a closed position for convenient storage.

The ball thrower includes a first arm or a throwing arm. The first arm or the throwing arm releases the ball during a throwing motion applied by an operator. The ball thrower includes a second arm or a reserve arm that is engaged to the first arm or the throwing arm. The second arm or the reserve arm may be hingedly engaged to the first arm or the throwing arm.

The ball thrower may be opened to an open position in which the first arm or the throwing arm are extended. The extra length of the ball thrower provide by the multiple arms provides greater leverage in throwing the ball. The ball thrower may be collapsed to a closed position wherein the first arm or the throwing arm are proximate to the second arm or the reserve arm. The collapsed position provides for more convenient storage of the ball thrower.

The throwing arm includes the throwing end and a first joint end. The throwing end and the first joint end are oppositely disposed on the throwing arm. The throwing end holds and releases the ball. The reserve arm includes the reserve end and a second joint end. The reserve end and the second joint end are oppositely disposed on the reserve arm. The first joint end is in a hinging engagement with the second joint end. The reserve end holds the ball.

In another aspect, the ball thrower includes the first arm, which includes the throwing end and the first joint end. The throwing end and the first joint end are oppositely disposed on the first arm. The throwing end releases the ball. The ball thrower includes the second arm, which includes the second joint end. The first joint end is in a hinging engagement with the second joint end. The hinging engagement includes a locking member that locks the throwing arm and the reserve arm in an open position.

In another aspect, the ball thrower includes the throwing arm, which includes the throwing end. The throwing end releases the ball during a throwing motion. The ball thrower includes the reserve arm. The reserve arm includes the reserve end, which holds the ball in a secure engagement. The throwing end and the reserve end allow the operator to maintain two different balls for use with the ball thrower.

Figure 1:
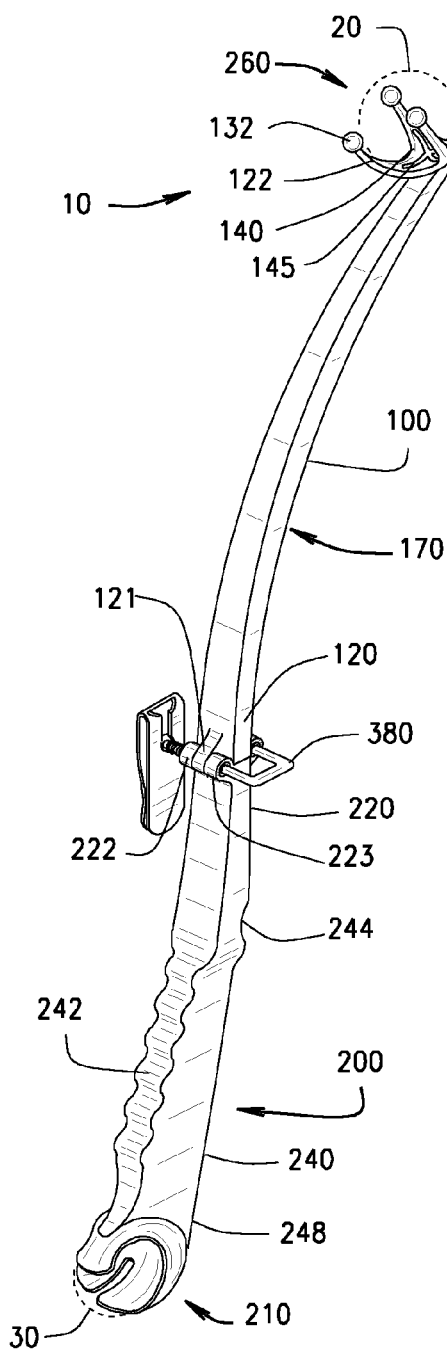
FIG. 1 is a perspective view of the ball thrower.

A ball thrower 10 will now be described with reference to FIGS. 1-16. FIG. 1 shows the ball thrower 10 with balls 20 and 30. The ball thrower 10 includes a throwing arm 100 and a reserve arm 200. The throwing arm 100 comprises a throwing end 110 and a first joint end 120. The throwing end 110 and the first joint end 120 are oppositely disposed on the throwing arm 100. The throwing arm 100 and the reserve arm 200 generally have an elongated shape. The throwing arm 100 and/or the reserve arm 200 may include a curved shape or bend in order to assist in throwing the balls 20 and 30.

The throwing end 110 holds and releases the balls 20 and 30 during a throwing motion in order to propel or fling the balls 20 or 30. The ball thrower may 10 be used with one or both of balls 20 or 30, as well as with one or more other balls. The ball thrower 10 may be used to serially throw the balls 20 and 30.

The reserve arm 200 includes a reserve end 210 and a second joint end 220. The reserve end 210 holds the ball 20 in a generally secure engagement. The operator may place the ball 20 in the reserve end 210 and store the ball 20 in the reserve end 210.

The reserve end 210 and the second joint end 220 are oppositely disposed on the reserve arm 200. The first joint end 120 is in a hinging engagement with the second joint end 220.

The throwing arm 100 and the reserve arm 200 are hingedly connected via a joint 300 that joins the first joint end 120 and the second joint end 220.

Figure 8:
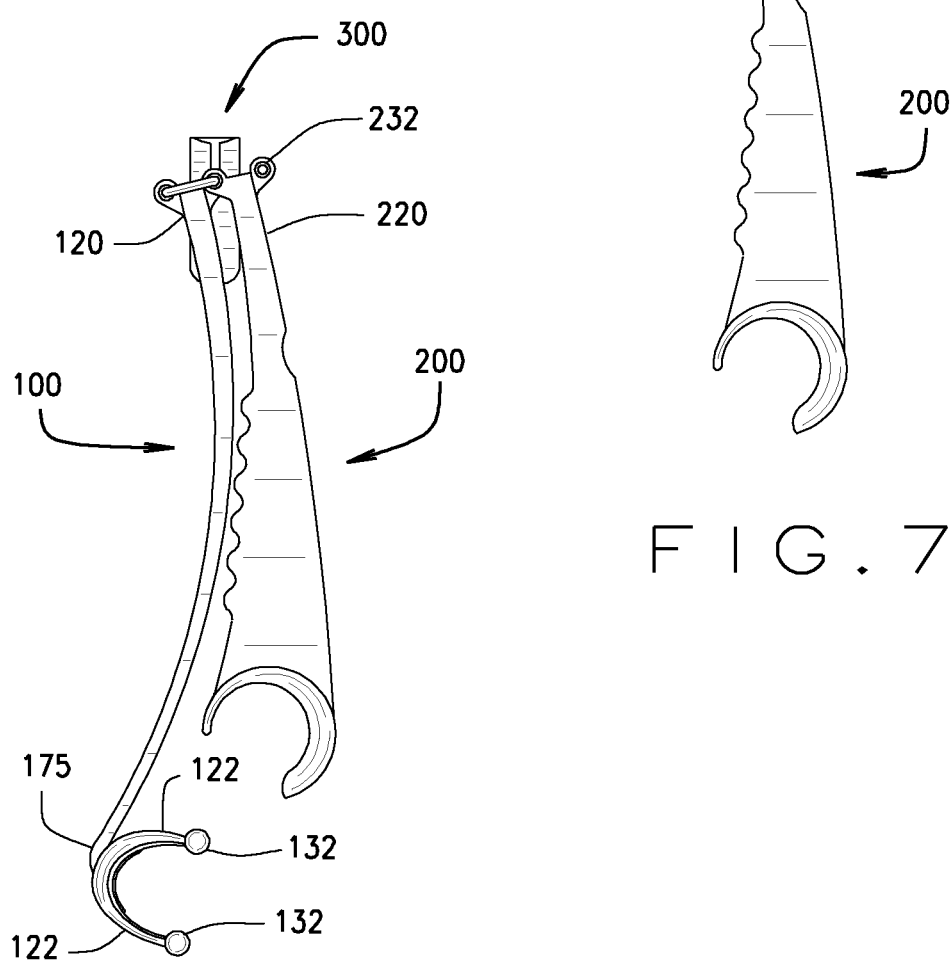
FIG. 8 is a view of the ball thrower in a collapsed configuration.

When the operator desires to use the ball thrower 10, the throwing arm 100 and the reserve arm 200 may be hingedly moved to fully extend the ball thrower 10. Next, a pin 380 is used to lock the ball thrower 10 in the fully open position. This provides a longer ball thrower 10, which provides greater leverage for throwing the ball 20 further distances. The joint 300 allows the ball thrower 10 to be collapsed and conveniently stored. As shown in FIG. 8, the ball thrower 10 collapses to a collapsed position, where the throwing arm 100 is in a near parallel relationship with the reserve arm 200.

The throwing arm 100 will now be described in greater detail. The throwing arm 100 includes a throwing shaft 170. A shaft end 175 is oppositely disposed to the first joint end 120. With reference to FIG. 6, the shaft end 175 is integral to or attaches to the throwing end 110.

The throwing end 110 holds and releases the balls 20 and 30 during a throwing motion in order to propel or fling the balls 20 or 30. The throwing end 110 includes structure, such as fingers or members, to hold, cup, and/or grip the balls 20 or 30 until the balls 20 or 30 are released during throwing. The throwing end 110 may include a plurality of elongate members 122 that hold the ball 20. FIG. 1 shows four elongate members 122 that define a first holding area 260 that holds the ball 20 until the ball 20 is thrown. In other aspects, fewer or additional elongate members 122 may be employed. For example, the throwing end 110 may include three to six elongate members 122. The elongate members 122 extend from a central portion 140 of the throwing end 110. The elongate members 122 extend from the central portion 140 in an arcuate manner that forms the first holding area 260. The elongate members 122 all have an approximately equivalent radius of curvature with a concave inner surface 124.

The elongate members 122 optionally include or terminate at rounded members 132. The rounded members 132 maintain the ball 20 in the first holding area 260. Outer surfaces 134 of the rounded members 132 physically contact the ball 20. Supports 145 further strengthen the elongate members 122. As shown in FIG. 6, the supports 145 are positioned in the central portion 140 and extended partially into the elongate members 122.

The construction of the throwing end 110 allows a variety of different sized balls 20 to be held in and thrown from the first holding area 260. The elongate members 122, in conjunction with the rounded members 132, hold a range of different size balls 20 and 30 with different outer circumferences. The elongate members 122 will flex or bend with respect to the central portion 140 to accommodate the larger balls 20 or 30. Further, the rounded members 132 assist in accommodating the range of different sized balls 20.

The ball 20 is held in the first holding area 260. Generally the rounded members 132 are holding the ball 20 within the first holding area 260. The ball 20 may contact the elongate members 122, however, the rounded members 132 are providing the holding engagement. In other embodiments, the elongate members 122 include or form other structures to hold the ball 20 within the first holding area 260. For example, the elongate members 122 may terminate in a wider tip that holds the ball 20 within the first holding area 260. For example, the elongate members 122 may include projections or protuberances of different shapes and sizes that hold the ball 20 within the first holding area 260.

Figure 13:
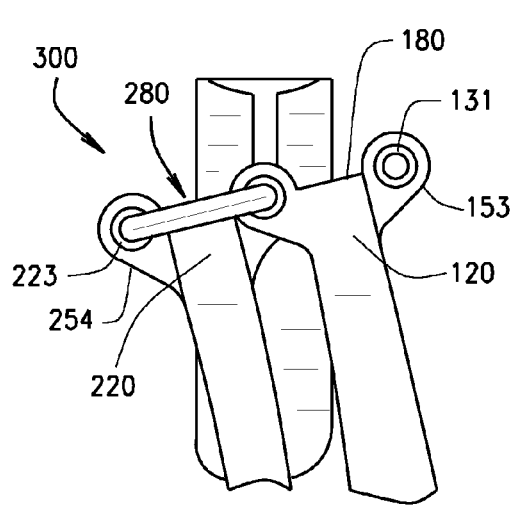
FIG. 13 shows the joint in a collapsed configuration.
Figure 14:
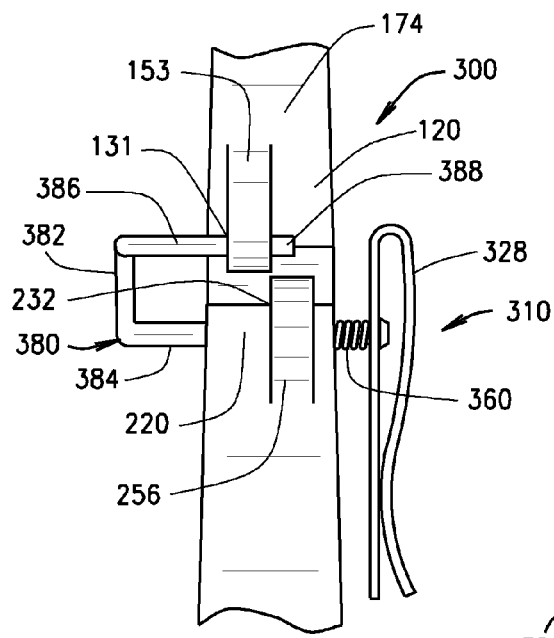
FIG. 14 shows the joint just before the pin is engaged.
Figure 15:
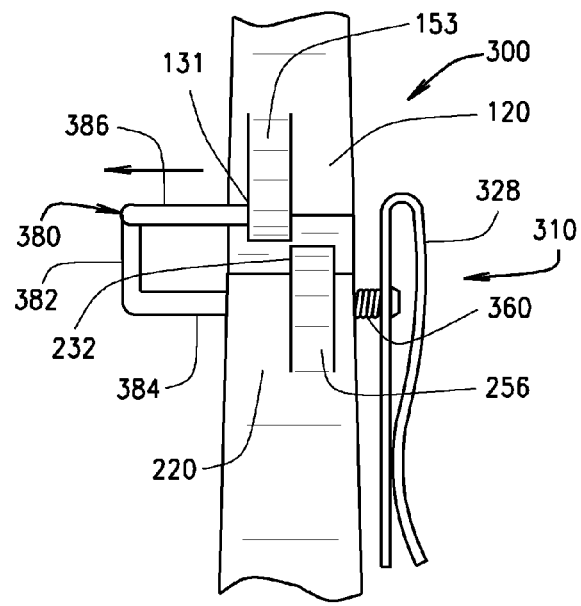
FIG. 15 shows the joint with the pin disengaged to allow closure.
Figure 16:
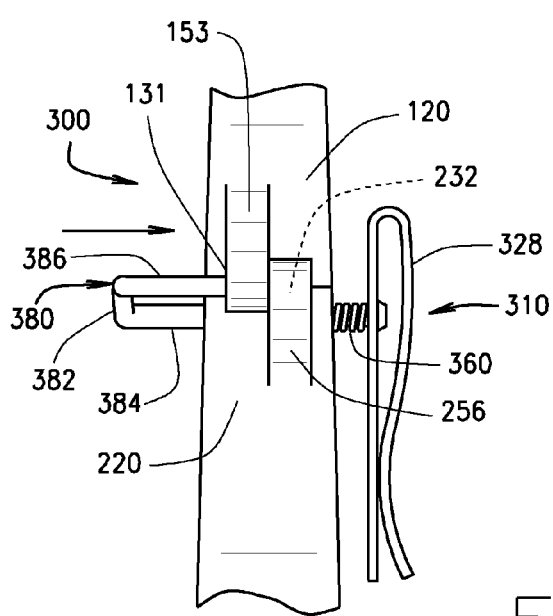
FIG. 16 is a view of the joint with the pin moving to the locking position.

The hinging engagement of the ball thrower 10 will now be described. The throwing arm 100 and the reserve arm 200 are hingedly engaged via the joint 300. The first joint end 120 of the throwing arm 100 is hingedly engaged to the second joint end 220 of the reserve arm 200. Opposite the throwing end 110, the throwing arm 100 includes the first joint end 120. With reference to FIG. 9, the first joint end 120 includes a first pivot hole 121. With reference to FIG. 13, the first joint end 120 includes a first locking hole 131 and a first end surface 180. The first pivot hole 121 is positioned in a first pivot hole housing 151 on the first surface 172 of the throwing arm 100. The first locking hole 131 is positioned in a first locking hole housing 153 on the second surface 174 of the throwing arm 100.

Figure 11:
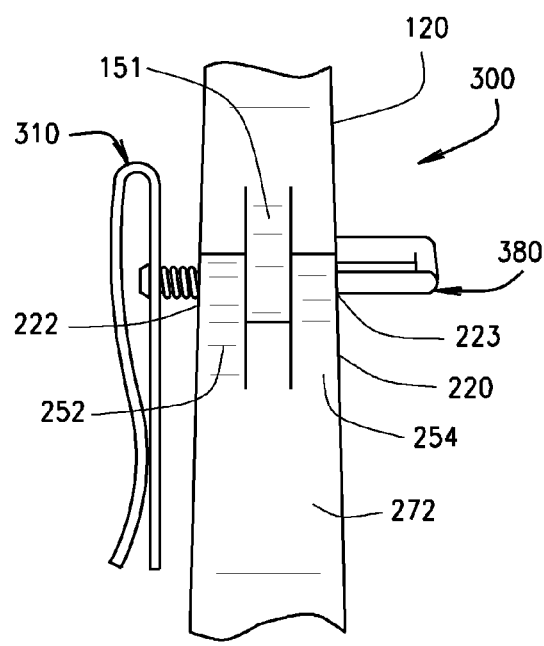
FIG. 11 shows the joint in the open configuration.
Figure 12:
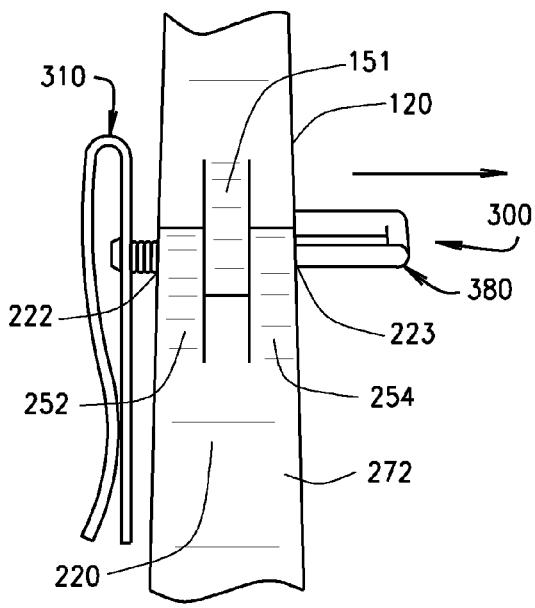
FIG. 12 shows the joint in the open configuration with the pin disengaged.

Opposite the reserve end 210, the reserve arm 200 includes the second joint end 220. With reference to FIG. 11, the second joint end 220 includes a second pivot hole 222, a third pivot hole 223, a second locking hole 232 (shown in FIGS. 7 and 8), and a second end surface 280. The second pivot hole 222 is positioned in a second pivot hole housing 252 on the first surface 272 of the reserve arm 200. The third pivot hole 223 is positioned in a third pivot hole housing 254 on the first surface 272 of the reserve arm 200. The second locking hole 232 is positioned in a second locking hole housing 256 on the second surface 274 of the reserve arm 200 (shown in FIGS. 14 and 15).

When the ball thrower 10 is fully opened, the first end surface 180 of the first joint end 120 is generally flush or in contact with the second end surface 280 of the second joint end 220. The pin 380 passes through the first pivot hole 121, the second pivot hole 222, the third pivot hole 223, the first locking hole 131, and the second locking hole 232 in order to lock the ball thrower 10 in the open position.

With reference to FIG. 10, the pin 380 includes a middle portion 382, a first pin arm 384, and a second pin arm 386. The first pin arm 384 passes through the first pivot hole 121 of the first joint end 120, as well as the second pivot hole 222, and the third pivot hole 223 of the second joint end 220. The pivotal engagement of the first pivot hole 121, the second pivot hole 222, and the third pivot hole 223 to the first pin arm 384 provides for pivoting of the throwing arm 100 relative to the reserve arm 200 during open and closing of the ball thrower 10.

The second pin arm 386 provides for the locking and unlocking feature of the joint 300. Specifically, the second pin arm 386 passes through the first locking hole 131 and the second locking hole 232. A second pin end 388 of the second pin arm 386 passes through the first locking hole 131 and the second locking hole 232. The pin 380 has a generally U-shaped construction with the first pin arm 384 and the second pin arm 386 in a parallel engagement. The first pin arm 384 extends from an opposite portion of the middle portion 382 as the second pin arm 386.

The second pin arm 386 includes a cap end 390. A spring 360 is mechanically engaged to the first pin arm 384. The spring 360 biases the clip 310. An end 362 of the spring contacts the cap end 390, while a second end 364 of spring 360 contacts a housing of the second pivot hole 222. The spring 360 biases the pin 380 to the closed position. When it is desired to unlock the pin 380, the user presses or urges against a cap end surface 392 of the cap end 390 to push the pin 380 out of the first locking hole 131 and the second locking hole 232 to thus unlock the reserve arm 200 from the throwing arm 100.

The clip 310 is removably engaged to the ball thrower 10. The clip 310 includes a first clip member 320. The first clip member 320 includes an interior surface 324 and an exterior surface 328. The clip 310 further includes a second clip member 340. The second clip member 340 includes an interior surface 346 and an exterior surface 348. The interior surface 324 and the interior surface 346 define a holding region 350. The clip 310, via its holding region 350, allows the ball thrower 10 to be conveniently carried on a belt, waistband, pocket, or the like.

With reference to FIG. 10, the clip 310 is further removable from the ball thrower 10 in the event the operator does not wish to use the clip 310. The second clip member 340 includes an opening 342 and a channel 344. The opening 342 of the clip 310 is passed over the cap end 390 of the clip 310. The first pin arm 384 slides through the channel 344 of the second clip member 340. In addition to providing a convenient storage mechanism for the ball thrower 10, the clip 310 further provides a convenient lever or handle to use to push the pin 380 during the opening or collapsing of the ball thrower 10.

In operation of the ball thrower 10, an operator may press on the exterior surface 328 of the clip 310 to open the clip 380. When pressure or force is applied to the exterior surface 328 of the clip 310, the interior surface 324 of the clip 310 is pushed against the cap end surface 392 which translates to withdrawing the second pin arm 386 from the first locking hole 131 and the second locking hole 232.

Figure 2:
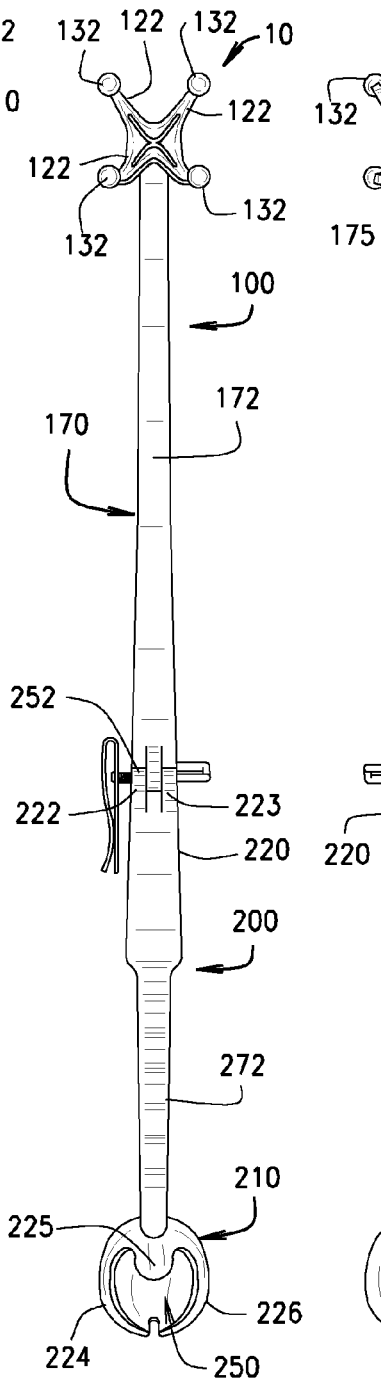
FIG. 2 is a front view of the ball thrower.
Figure 3:
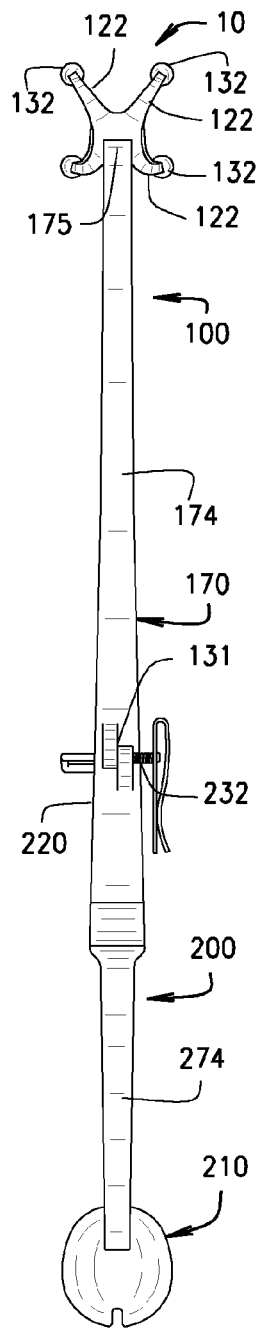
FIG. 3 is a rear view of the ball thrower.
Figure 7:
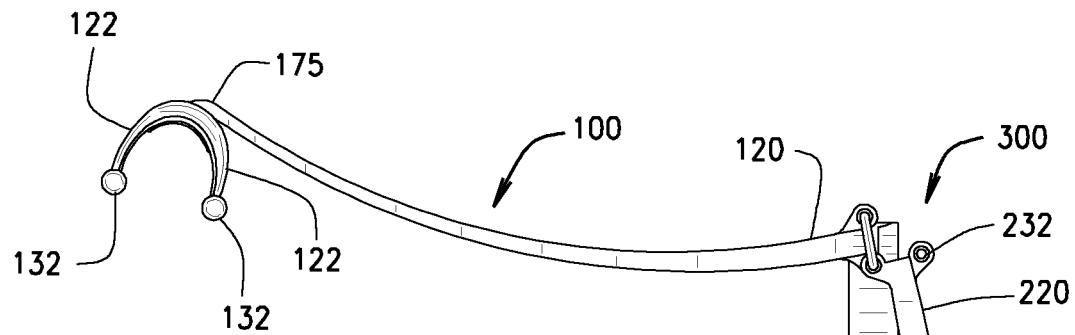
FIG. 7 is a view of the ball thrower in a semi-collapsed configuration.

The reserve arm 200 will now be described in greater detail. The reserve end 210 holds the balls 20 or 30 until the operator disengages the balls 20 or 30 from the reserve end 210. The reserve end 210 holds the balls 20 or 30 in a secure yet releaseable engagement. The reserve end 210 may include a variety of structures to hold the balls 20 or 30 in the secure and releasable engagement. For example, the reserve end 210 includes a plurality of retention members that hold the balls 20 or 30. As shown in FIG. 2, the reserve end 210 includes a first retention member 224, a second retention member 225, and a third retention member 226. The retention members 224, 225, 226 define a second holding area 250. In other embodiments, the reserve end 210 may include other structures to hold the ball 20 in the secure yet releasable engagement. Such structures, may include, for example, curved fingers, a matrix or cage with an opening to insert the ball 20, or other gripping members to hold the ball 20.

The reserve end 210 is used to hold and maintain the balls 20 or 30 until time for use. The balls 20 or 30 will generally be securely maintained in the reserve end 210. The retention members 224, 225, 226 partially or substantially enclose an outer surface of the balls 20 or 30. The reserve end 210 securely holds the balls 20 or 30 to prevent accidental release of the balls 20 or 30 from the reserve end 210. The balls 20 or 30 are press-fitted or snap-fitted into the reserve end 210. The balls 20 or 30 generally will remain engaged to the reserve end 210 until the operator pulls the ball 20 or 30 out of the reserve end 210.

The reserve arm 200 further includes the handle portion 240, which includes finger grips 242 in the first surface 272 and a thumb grip 244 in the first surface 274. The reserve arm 200 includes a handle end 248 that is integral or attached to the reserve end 210.

The throwing arm 100 and the reserve arm 200 may each be an integral unit or member of a thermoplastic material. The throwing arm 100 and the reserve arm 200 may be manufactured through an injection molding of thermoplastics, such as, for example, polypropylene, polyvinylchloride, polycarbonate, polystyrene, and blends thereof. Throwing arm 100 and reserve arm 200 may further be formed through thermoforming, molding, or other plastic forming process known in the art.

The ball thrower 10 has an overall length of approximately 18 inches to approximately 48 inches. This increased length provided by the fully opened ball thrower 10 provides greater leverage when throwing the balls 20 or 30. The throwing arm 100 generally has a bent or slightly curved shape. The first surface 172 of the throwing arm 100 is generally convex, while the second surface 174 of the throwing arm 100 is generally concave.

Further, the reserve end 210 provides a secure engagement to store the balls 20 or 30. The throwing end 110 may further be used to pick up a ball 20 or 30 that is lying on the ground and throw the balls 20 or 30 without the operator having to manually touch the ball 20 or 30. After a dog has been playing with the balls 20 or 30, the balls 20 or 30 may be soiled and/or wet, and the operator may appreciate not having to touch the balls 20 or 30. The ball thrower 10 may be used with a variety of different sized balls of different constructions, for example, a common tennis ball, rubber balls, or other specialized plastic balls may be used with the ball thrower 10.

Importantly, the throwing end 110, due to its construction, is capable of holding and throwing balls ranging in different sizes and materials. As described above, the elongate member 122, in conjunction with the rounded member 132, accommodates these different sized balls. The elongate member 122 may flex or bend to accommodate larger sized balls.

Those skilled in the art will appreciate that variations from the specific embodiments disclosed above are contemplated by the invention. The invention should not be restricted to the above embodiments, but should be measured by the following claims.

What is claimed:

1. A ball thrower, comprising:
    a throwing arm, the throwing arm comprising a throwing end and a first joint end, wherein the throwing end and the first joint end are oppositely disposed on the throwing arm;
    the throwing end holds and releases a ball;
    a reserve arm, the reserve arm comprising a reserve end and a second joint end, wherein the reserve end and the second joint end are oppositely disposed on the reserve arm;
    the first joint end is in a hinging engagement with the second joint end; and,
    the reserve end holds the ball.

2. The ball thrower according to claim 1, wherein the throwing end holds and releases a first ball while the reserve end holds a second ball.

3. The ball thrower according to claim 1, wherein the reserve arm and the throwing arm lock in an open position.

4. The ball thrower according to claim 1, wherein the reserve arm and the throwing arm collapse to a collapsed position.

5. The ball thrower according to claim 1, wherein the ball thrower comprises a clip.

6. The ball thrower according to claim 1, wherein the clip is removably engaged to the ball thrower.

7. The ball thrower according to claim 1, wherein the reserve end and the throwing end hold a range of different sized balls.

8. The ball thrower according to claim 1, wherein the reserve end holds the ball in a more secure engagement than the throwing end holds the ball.

9. The ball thrower according to claim 1, wherein the throwing end includes a plurality of elongate members that hold the ball.

10. The ball thrower according to claim 9, wherein the elongate members have an arcuate shape and extend from a central portion of the throwing end to define a first holding area for holding the ball.

11. The ball thrower according to claim 9, wherein the elongate members include or terminate at rounded members, which maintain the ball in the throwing end until the ball is thrown from the throwing end.

12. The ball thrower according to claim 9, wherein the elongate members extend from a central portion, and the elongate members flex or bend with respect to the central portion to accommodate and hold a range of different sized balls.

13. The ball thrower according to claim 1, wherein the hinging engagement includes a pin that passes through portions of the first joint end and the second joint end.

14. The ball thrower according to claim 13, wherein the pin passes through pivot holes of the throwing arm and the reserve arm to provide for the hinging of the throwing arm and the reserve arm to open or collapse the ball thrower, and the pin passes through locking holes of the throwing arm and the reserve arm in order to lock the ball thrower open.

15. The ball thrower according to claim 13, wherein the pin passes through an internal diameter of the spring, and the pin is biased by the spring.

16. A ball thrower, comprising:
    a first arm, the first arm comprising a throwing end and a first joint end, wherein the throwing end and the first joint end are oppositely disposed on the first arm;
    the throwing end releases a ball;
    a second arm, the second arm comprising a second joint end;
    the first joint end is in a hinging engagement with the second joint end; and,
    the hinging engagement comprising a locking member that locks the throwing arm and the reserve arm in an open position.

17. A method of using a ball thrower, comprising:
    providing a ball thrower, wherein the ball thrower comprises a first arm, the first arm comprising a throwing end and a first joint end, wherein the throwing end and the first joint end are oppositely disposed on the first arm; the throwing end releases a ball; a second arm, the second arm comprising a second joint end; the first joint end in a hinging engagement with the second joint end;
    opening the ball thrower;
    locking the ball thrower in an open position; and,
    throwing the ball from the throwing end of the ball thrower.

18. The method of using the ball thrower according to claim 17, further comprising unlocking the ball thrower and collapsing the ball thrower.

19. A method of using a ball thrower, comprising:
    providing a ball thrower, wherein the ball thrower comprises a throwing end and a reserve end, wherein the throwing end and the reserve end are oppositely disposed on the ball thrower; the throwing end releases a ball; and the reserve end holds the ball;
    removing the ball from the reserve end;
    placing the ball in the throwing end; and,
    throwing the ball from the throwing end of the ball thrower.

20. The method of using the ball thrower according to claim 19, further comprising throwing a first ball from the throwing end while storing a second ball in the reserve end.

21. A method of manufacturing a ball thrower, comprising:
    providing a first arm and a second arm, wherein the first arm comprises a throwing end to release a ball when a throwing motion is applied to the ball thrower; and,
    engaging the first arm to the second arm in a hinging engagement via a hinging member; wherein the second arm hinges relative to the first arm, wherein the hinging member locks and unlocks the second arm relative to the first arm.

* * * * *